United States Patent

White et al.

[11] Patent Number: 5,939,011
[45] Date of Patent: Aug. 17, 1999

[54] METHOD FOR PRODUCING A MANDREL FOR USE IN HOT ISOSTATIC PRESSED POWDER METALLURGY RAPID TOOL MAKING

[75] Inventors: Dawn Roberta White, Ann Arbor; Daniel Edward Wilkosz, Ypsilanti, both of Mich.

[73] Assignee: Ford Global Technologies, Inc., Dearborn, Mich.

[21] Appl. No.: 09/055,199

[22] Filed: Apr. 6, 1998

[51] Int. Cl.⁶ .............................. C25D 1/10; B29C 33/38
[52] U.S. Cl. .......................... 264/401; 264/109; 264/226; 264/227; 264/219; 205/70
[58] Field of Search .................................... 264/109, 226, 264/227, 401, 219; 205/70

[56] References Cited

U.S. PATENT DOCUMENTS

| | | | |
|---|---|---|---|
| 4,063,705 | 12/1977 | Vodra | 205/70 |
| 4,620,903 | 11/1986 | Chamberlin | 205/70 |
| 5,013,409 | 5/1991 | Czor | 204/6 |
| 5,262,121 | 11/1993 | Goodno | 264/225 |
| 5,447,800 | 9/1995 | Dorsch et al. | 428/552 |
| 5,453,173 | 9/1995 | Oyama | 205/70 |
| 5,482,531 | 1/1996 | Pinnow et al. | 75/246 |
| 5,538,683 | 7/1996 | Pinnow et al. | 419/49 |
| 5,640,667 | 6/1997 | Freitag et al. | 419/31 |
| 5,728,284 | 3/1998 | Oyama | 205/70 |

*Primary Examiner*—James Derrington
*Attorney, Agent, or Firm*—Roger L. May; Damian Porcari

[57] ABSTRACT

A method for producing a composite mandrel (20) for use in creating a precise set of surface features inside a hot isostatic pressed (HIP) billet for producing a desired tool uses a composite nickel shell (16) and ceramic interior (18). A free form fabrication (FFF) or wax positive pattern (10) of the desired tool is made first, then a layer of nickel is deposited on the surface of the FFF positive pattern to produce a nickel shell (16) which is a negative of the desired tool. The final step in creating the composite mandrel (20) is filling the nickel shell (16) with ceramic material (18) to increase the rigidity of the nickel shell thereby forming a mandrel for use in an HIP process to make the desired tool.

10 Claims, 2 Drawing Sheets

METHOD FOR PRODUCING A MANDREL FOR USE IN HOT ISOSTATIC PRESSED POWDER METALLURGY RAPID TOOL MAKING

TECHNICAL FIELD OF THE INVENTION

The present invention relates generally to mandrels for tool making, and, more particularly, to a method for producing a mandrel for use in hot isostatic pressed powder metallurgy rapid tool making.

BACKGROUND OF THE INVENTION

Powdered metal is used to fabricate tools and components because it can provide a finished product that does not require extensive machining to achieve the desired surface finish. A mandrel, fabricated to a desired geometrical shape, is used for fabricating hot isostatic pressed (HIP) powder metal tooling. The mandrel must be geometrically accurate and produce an excellent surface finish to minimize the amount of further machining required to finish the tool.

A conventional electrodeposition process for producing a metal electrodeposition product duplicates the surface configuration of an object. In the process a model is made of an original or desired object and metal is electrodeposited onto the model's contacting surface (i.e., molds working surface) which is a negative of the original object. The model is removed leaving the deposited metal with the front metal surface, the surface that was in contact with the mold, replicating the surface of the original object. When the metal is deposited in a thin layer, a backing material is added to the back metal surface, the surface that was not in contact with the mold, to provide stability and strength to the metal. The backing material is added before separating the deposited metal from the mold. This process has been used for replicating works of art, and while it duplicates fine surface details, it is painfully slow requiring time to apply and remove the backing material in addition to the several days required to deposit metal to a thickness of one sixteenth of an inch.

Another process, for manufacturing a three-dimensional electroformed mold shell, uses a model onto which molten epoxy resin is poured to form an inverted model shaped like a shell. Double sided adhesive tape is applied to the front surface of the shell that was in contact with the model. A conductive network body is applied on the tape and deformed into a three-dimensional shape so as to adapt itself to the shape of the front shell surface. The network body forms the cathode for electrodeposition. The process is interrupted to remove the network body from the tape and inverted shell thereby adding more time to the several days required to complete electrodeposition.

Laser sintering may also be employed to fabricate a metal article. The article is produced in layerwise fashion from a laser fusible powder that is dispensed one layer at a time. A difficulty with this process is that the article formed is not fully dense and retains some porosity which limits its structural strength. After fabrication of the article, the laser is again used to apply a gas impervious skin to the article for use in a hot isostatic pressing (HIP) process to densify the article. The dimensional resolution and shape complexity of articles produced by HIP processes are somewhat limited because shrinking occurs during the process. This technology requires special laser sintering equipment.

Quite understandably, production of the mandrel is one of the most important steps in the process of tool making because a poor mandrel will produce a poor tool requiring expensive machining to obtain the desired surface finish. On the other hand, a good mandrel yields the greatest possible savings in cycle time in tool production. Machined mandrels have excellent surface finishes but machining is slow and increases cycle time in tool production. Ceramic molds can be used but they do not provide the very fine surface finishes required for tool making. Accordingly, it will be appreciated that it would be highly desirable to have a method for producing a mandrel for use in tool making that provides the very fine surface finish required without further machining and that lends itself to rapid tool making.

SUMMARY OF THE INVENTION

The present invention is directed to overcoming one or more of the problems set forth above. Briefly summarized, according to one aspect of the present invention, a method for producing a mandrel for use in creating a precise set of surface features inside a hot isostatic pressed (HIP) billet for producing a desired tool, comprises forming a free form fabrication (FFF) or high speed machined wax positive pattern of the desired tool with the positive pattern having a surface; smoothing the surface of the positive pattern for best surface finish; depositing a layer of nickel on the surface of the positive pattern thus producing a nickel shell by electroplating with the nickel shell being a negative of the desired tool; and filling the shell with ceramic material and increasing rigidity of the nickel shell thereby forming a mandrel for use in an HIP process to make the desired tool.

The mandrel is a composite structure of nickel and ceramic material that is fabricated directly from a stereolithography or other free form fabrication pattern or wax pattern. It is relatively low in cost and can be produced rapidly because plastic patterns can be used which are easily machined if required to obtain the desired surface finish. Only a thin electrodeposited shell is required because the shell need not withstand impact loading. The ceramic filling provides structural integrity.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Referring to FIGS. 1–4, a free form fabrication (FFF) or machined wax pattern 10 is immersed in a plating tank 12 containing an aqueous solution of metal salts, such as nickel for example when the plating metal is nickel. Nickel for plating is supplied by a nickel anode 14 and is deposited on the desired pattern 10 which is negatively charged. The plating process deposits a layer of nickel on the desired pattern to a thickness of about 0.0001 to 0.25 inches creating a nickel shell 16. As illustrated, the pattern is a positive of the tool to be made and the nickel shell is a negative of the tool to be made. Where the surface of the nickel shell 16 and pattern 10 are adjacent, the pattern surface is a positive of the tool and the outer surface of the shell is a negative of the tool. The deposited metal is first deposited on what is the outer surface of the shell. The shell thickens from the outside toward the inside so that any inconsistencies or irregularities caused by electrical or temperature gradients during electrodeposition as the shell thickens will not affect the shell surface. Thus, the surface finish of the pattern is transferred exactly to the shell.

The FFF pattern 10 can be made using a stereolithography process or other processes as is known in the art. The FFF pattern is preferably wax or plastic which can be quickly and easily smoothed for the desired surface finish. Using wax or plastic results in a much faster process than using metal or other materials that are more difficult to machine.

Figure 1:
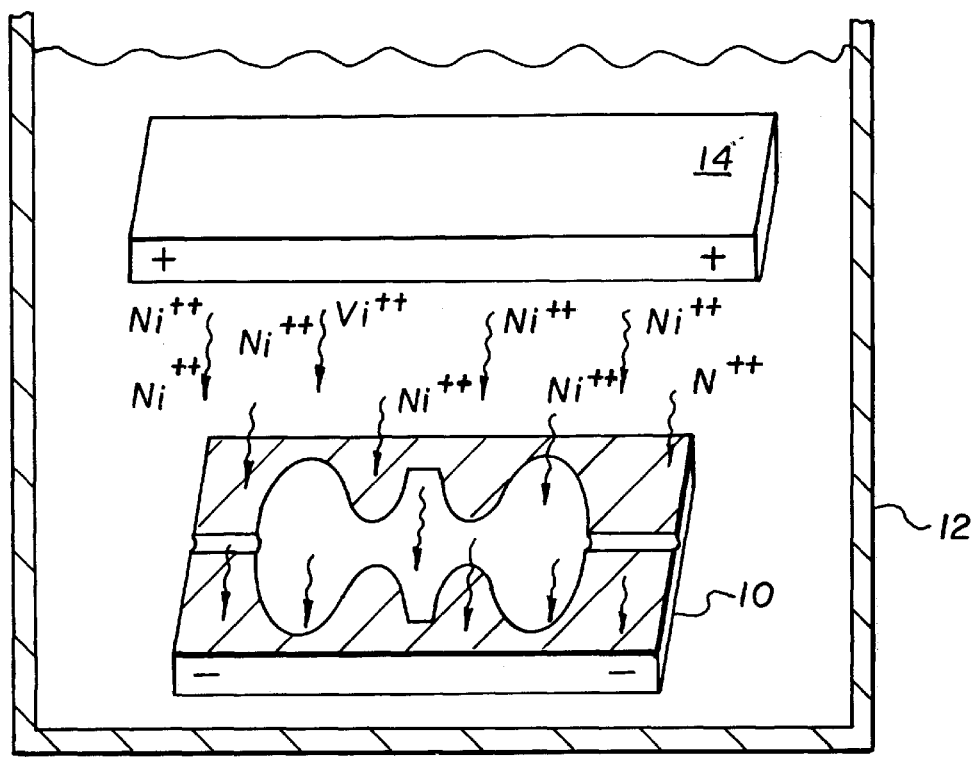
FIG. 1 is a diagram illustrating the generation of a nickel mandrel shell by electroplating according to the present invention.
Figure 2:
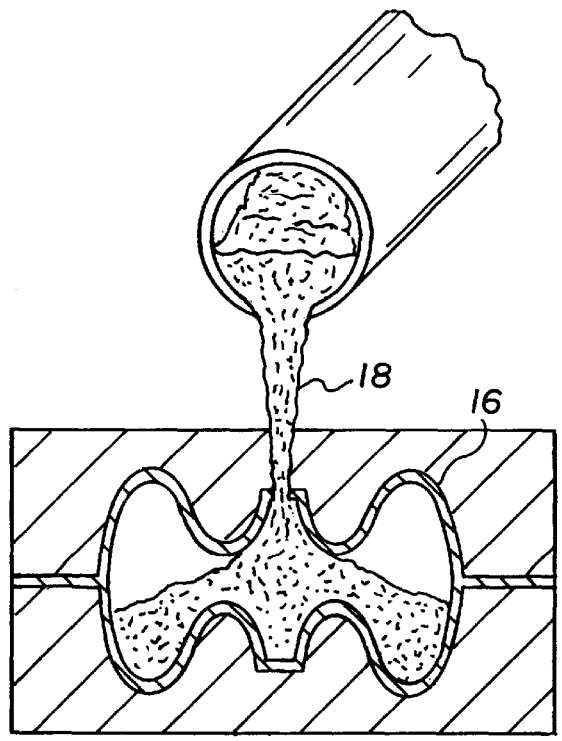
FIG. 2 is a diagram illustrating filling the mandrel shell of FIG. 1 with ceramic slurry.
Figure 3:
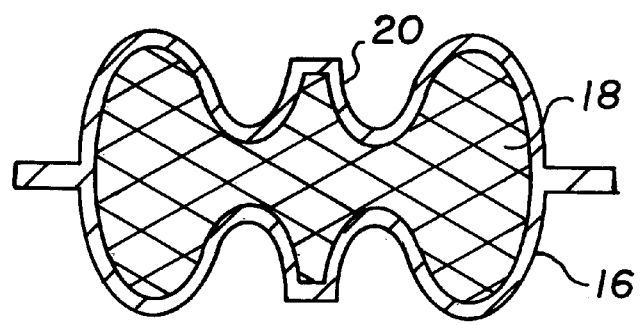
FIG. 3 is a cross-sectional view of the ceramic filled mandrel of FIG. 2.

Referring to FIG. 2, when the nickel shell 16 reaches the desired thickness, the plating process is halted and the shell 16 is filled with a ceramic slurry 18 by casting. The ceramic slurry 18 can be any one of a number of materials which have the compressive strength and high temperature resistance required for the manufacturing operations. For example, alumina or zirconia, or any other strong, refractory ceramic which can be produced by casting is suitable. Other methods for creating the ceramic filler include gel casting or other processes for filling and solidifying a metal shell with a ceramic material. The purpose of the ceramic material is to prevent the collapse of the metal shell when the shell is subjected to isostatic pressures on the order of about 15 ksi during the hot isostatic pressing (HIP) process. This process takes place at about 2100° F.; so, it is also important that the ceramic be dimensionally stable at this temperature. Of course, the ceramic material is not necessary when the shell has a thickness and configuration sufficient to withstand the HIP process temperature and pressure.

Figure 4:
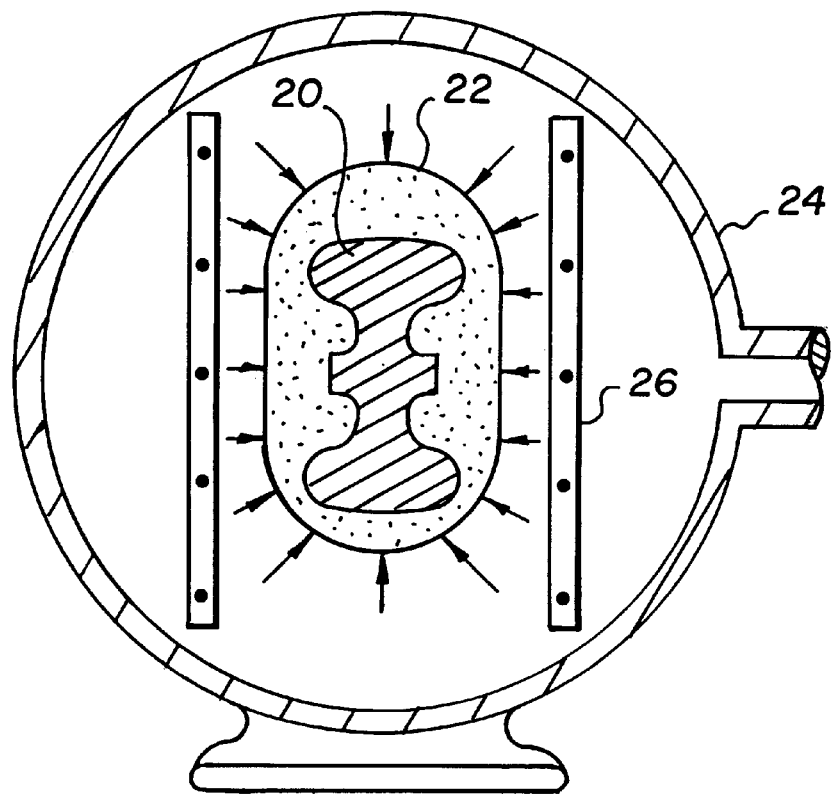
FIG. 4 illustrates the hot isostatic pressing process to form a tool using the ceramic filled mandrel of FIG. 3.

After filling with ceramic material, the composite nickel shell-ceramic mandrel 20 (FIG. 3) is embedded in the powdered metal 22, placed in a pressure vessel 24, pressurized, and heated by heating elements 26 (FIG. 4). The composite nickel shell-ceramic mandrel 20 may be coated with a release agent and used again. Tests show that the composite nickel shell-ceramic mandrel can be used a minimum of a dozen times without dimensional or surface finish degradation. The surface finish obtained is dependent on the surface finish of the model or pattern; thus, plastic patterns are preferred because of their easy and rapid machinability.

A difficulty with the HIP process is the requirement of a gas impervious surface which is necessary to retain the pressure to form the article. The present invention can provide such a surface in the form of a the nickel shell when necessary. Electroplating produces a nickel shell whose thickness can be adjusted until it is impervious to nitrogen or other inert gas used in the process for the pattern selected, but gas imperviousness is not necessary because the ceramic filler material prevents collapse of the shell. As mentioned, the plating process deposits a layer of nickel on the FFF or wax pattern to a thickness of about 0.0001 to 0.25 inches. At these thicknesses, the shell is suitable for the HIP process. The shell is not subject to impact loading; so, hardness of the shell is not a consideration, only its gas permeability and ability to withstand HIP pressures.

It can now be appreciated that a method for producing a mandrel has been presented. The mandrel is embedded in powdered metal for use in creating a precise set of surface features inside a hot isostatic pressed billet for producing a set of tools from it. The mandrel is a composite structure rather than monolithic, and can be fabricated directly from a stereolithography or other free form fabrication pattern. It features low cost and rapid production compared to other methods of creating mandrels. Other methods for producing tooling using the HIP process to produce tooling use machined steel mandrels or ceramic mandrels. Machined steel mandrels offer precision and good surface finish, but are expensive and time consuming to produce. A ceramic mandrel may be precise, but it has a comparatively poor surface finish which requires other processes to finish the resulting tool, adding time and cost to the process. The composite mandrel combines the precision and good surface finish of a machined steel mandrel with the low cost and rapidity of production of a ceramic mandrel.

As is evident from the foregoing description, certain aspects of the invention are not limited to the particular details of the examples illustrated. For example, while nickel metal is preferred, other metals can be used for a particular application. It is therefore contemplated that other modifications and applications will occur to those skilled the art. It is accordingly intended that the claims shall cover all such modifications and applications as do not depart from the true spirit and scope of the invention.

What is claimed is:

1. A method for producing a mandrel for use in producing a desired tool, said desired tool having a surface, said method comprising the steps of:

forming a free form fabrication (FFF) or wax pattern of the desired tool, said pattern having a surface that is a positive of the surface of the desired tool;

electrodepositing a layer of metal on the surface of the pattern and producing a metal shell having an outer surface in contact with the pattern surface, said outer surface of said metal shell being a negative of the surface of the desired tool; and filling the metal shell with ceramic material, curing the ceramic material in the metal shell and increasing rigidity of the metal shell thereby forming a rigid composite ceramic and metal mandrel for use in making the desired tool.

2. The method of claim 1 including the step of smoothing the surface of the pattern to a desired surface finish before depositing the layer of metal on the surface.

3. The method of claim 1 including the step of removing the metal shell from the pattern before filling the metal shell with ceramic material.

4. The method of claim 1 wherein the step of electrodepositing a layer of metal on the surface of the pattern and producing a metal shell includes depositing the metal to a thickness sufficient to make the shell gas impervious at a temperature of about 2100° F. and pressure of about 15 ksi.

5. A method for producing a mandrel for use in creating a precise set of surface features inside a hot isostatic pressed (HIP) billet for producing a desired tool, comprising the steps of:

forming a free form fabrication (FFF) or wax positive pattern of the desired tool, said positive pattern having a surface;

electrodepositing a layer of nickel on the surface of the positive pattern and producing a nickel shell which a negative of the desired tool; and filling the shell with ceramic material, curing the ceramic material in the shell and increasing rigidity of the nickel shell thereby forming a rigid composite ceramic and nickel mandrel for use in an HIP process to make the desired tool.

6. The method of claim 5 including the step of machining the surface of the positive pattern for a desired surface finish before depositing the layer of nickel on the surface.

7. The method of claim 5 including the step of removing the nickel shell from the pattern before filling the nickel shell with ceramic material.

8. The method of claim 5 wherein the step of electrodepositing a layer of nickel on the surface of the pattern and producing a metal shell includes depositing the nickel to a thickness sufficient to make the shell gas impervious at a temperature of about 2100° F. and pressure of about 15 ksi.

9. A method for producing a mandrel for use in creating a precise set of surface features inside a hot isostatic pressed (HIP) billet for producing a desired tool, comprising the steps of:

forming a free form fabrication (FFF) or wax positive pattern of the desired tool, said positive pattern having a surface;

smoothing the surface of the positive pattern for a desired surface finish;

electrodepositing a layer of nickel on the surface of the positive pattern and producing a nickel shell, said nickel shell being a negative of the desired tool;

filling the shell with ceramic material and increasing rigidity of the nickel shell thereby forming a mandrel for use in an HIP process to make the desired tool; and curing the ceramic material in the nickel shell.

10. The method of claim 9 including the step of removing the metal shell from the pattern before filling the metal shell with ceramic material.

* * * * *